Aug. 30, 1960 A. C. NOLTE, JR 2,950,531
KNIFE
Original Filed April 24, 1956
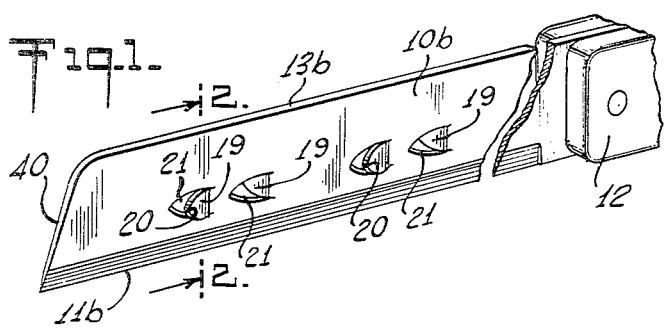
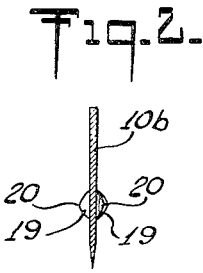
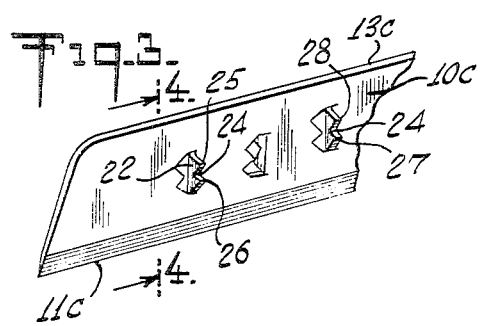
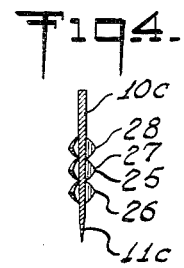
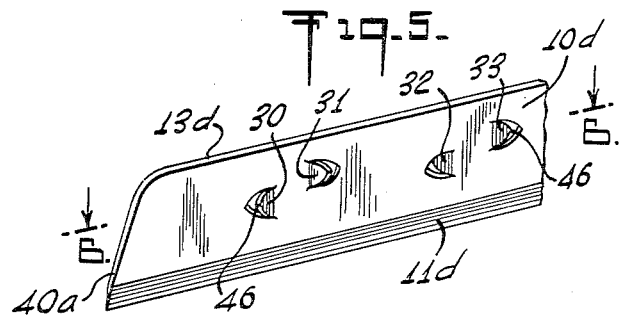
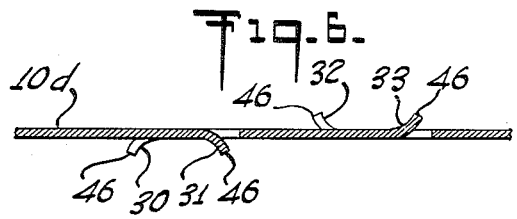
INVENTOR
*ALBERT C. NOLTE, JR.*
BY
*Moses, Nolte, & Nolte*
ATTORNEYS

United States Patent Office 2,950,531
Patented Aug. 30, 1960

2,950,531

KNIFE

Albert C. Nolte, Jr., East Norwich, N.Y.

Original application Apr. 24, 1956, Ser. No. 580,368, now Patent No. 2,907,108, dated Oct. 6, 1959. Divided and this application Feb. 3, 1959, Ser. No. 790,970

6 Claims. (Cl. 30—353)

This application is a divisional application of my co-pending application Serial No. 580,368, filed April 24, 1956, now Patent No. 2,907,108.

This invention relates to new and useful improvements in knives and has particular application to a knife design to slice "English muffins" and related bakery products.

In order that the muffin properly toast after it has been sliced in half, it is necessary that the inside portion so exposed have a rough or jagged surface.

Heretofore, this jagged surface has only been achieved by tearing the muffin by hand, or by roughening the inner surfaces of the muffin after slicing, by a fork. It is obvious that either method is unsatisfactory.

It is an object of this invention to provide a means whereby the smooth inner surfaces will be ripped to produce the desired result by a simple and inexpensive means easily adaptable to commercial manufacture.

It is a further object of this invention to provide a second cutting edge which will operate in conjunction with the usual cutting blade of a knife to produce the desired effect.

This second cutting edge operates at the same time as the usual cutting edge so that the muffin will be sliced by the first cutting edge and the inner surfaces so exposed ripped at the same time by the second cutting surface.

Other objects and advantages of my invention will become apparent during the following specification, and accompanying drawings, forming part of the specification, wherein like numerals, with distinguishing subscripts, are used to designate like parts throughout the specification and drawing:

Fig. 1 is a partial perspective showing a modified form of the knife;

Fig. 2 is a sectional view along line 2—2 of Fig. 1;

Fig. 3 is a partial perspective showing a modified form of the knife;

Fig. 4 is a sectional view along line 4—4 of Fig. 3;

Fig. 5 is a partial perspective showing a modified form of the knife; and

Fig. 6 is a sectional view along line 6—6 of Fig. 5.

Referring to the drawings there is shown in Figs. 1 and 2 at a point intermediate top edge 13b and cutting edge 11b, substantially equally sized projections 19 are flanged slightly outward from blade 10b. The projections taper to a point 20 in a direction toward the front edge 40 of the knife blade. This forms an unobstructed opening 21 in the blade 10 which is attached in well known fashion to a handle 12. Said projections 19 are alternately flanged to one side and to the other in pairs, but keeping points 20 in a common horizontal plane, so that the distance between successive pairs is greater than the distance between the projections within the pairs.

In Figs. 3 and 4 at a point intermediate the top edge 13c and cutting edge 11c, projections 22 are flanged substantially outwardly and perpendicularly to blade 10c. The projections are equidistant from each other and have a notch 24 to form teeth 25 and 26. The projections are alternately formed to one side and to the other and grouped in successive pairs so that every other pair would be disposed slightly near the top edge 13c, but located so that tooth 25 would be in the same horizontal plane as tooth 27.

In Fig. 5 at a point intermediate the top edge 13d and cutting edge 11d, projections 30, 31, 32 and 33 are flanged slightly outward from blade 10. The projections are flanged in pairs. The first pair of projections, 30 and 31 closest to the edge 40a are bent in one direction away from blade 10d. The next pair of projections, 32 and 33 are bent in the opposite direction, away from blade 10d as the pair of projections directly preceding. The projections 31 and 33 are disposed slightly closer to top edge 13d than projections 30 and 32, but so located that projections 31 and 33 would be in the same horizontal plane. The projections are alternately in pairs, then to one side and the other, but formed so that the distance between pairs is greater than the distance between the projections within the pairs. All the projections are tapered to point 46.

There has been described what is believed to be the best embodiments of this invention. It is not wished, however, to be confined to the specific embodiments shown. Many modifications of these embodiments may be made by one skilled in the art without departing from the spirit of this invention.

What is claimed is:

1. A knife adapted to cut English muffins comprising an elongated blade, a handle attached to one end of said blade, a first cutting edge along the bottom edge of said blade, said blade having portions intermediate its heights extending outwardly on each side of said blade forming second cutting edges, said blade being of thin substantially uniform thickness to permit said first cutting edge to slice through a muffin to expose an interior portion of said muffin to said second cutting edges, said second cutting edges cooperating with said first cutting edge whereby the interior portion of said muffin exposed by said first cutting edge is roughened by said second cutting edges.

2. A knife as in claim 1, wherein said second cutting edges comprise triangular notched areas connected to said blade along a side of said triangular portion and having the pointed portions of said areas extending outwardly on each side of said blade in a common direction.

3. A knife as in claim 1, wherein said second cutting edges comprise triangular notched areas connected to said blade along a side of said triangular portion and having the pointed portion of said areas extending in opposite directions.

4. A knife as in claim 1, wherein said second cutting edges comprise notched areas intermediate the height of said blade, said notched areas extending to opposite sides of said blade.

5. A knife as in claim 1, wherein said second cutting edges comprise a series of joined notched triangular areas connected to said blade along a side of said triangular area and having the pointed portions of said areas extending outwardly on each side of said blade in a common direction.

6. A knife according to claim 1, wherein said second cutting edges comprise a series of notched portions integrally formed from said blade.

References Cited in the file of this patent

UNITED STATES PATENTS

| | | |
|---|---|---|
| 719,606 | Nelson et al. | Feb. 3, 1903 |
| 1,726,326 | Wallace | Aug. 27, 1929 |
| 1,871,631 | Tannehill | Aug. 16, 1932 |
| 1,997,953 | Van Derkuy | Apr. 16, 1935 |
| 2,876,487 | Pasquale | Mar. 10, 1959 |

FOREIGN PATENTS

| | | |
|---|---|---|
| 30,287 | Sweden | Feb. 11, 1911 |